May 18, 1965 S. G. CHRISTISON 3,184,018
REVERSIBLE DRIVE ASSEMBLY INCLUDING FLUID-POWERED PRIME MOVER
Filed Dec. 14, 1962 4 Sheets-Sheet 2

INVENTOR.
SOMMERVILLE G. CHRISTISON
BY
attys.

May 18, 1965 S. G. CHRISTISON 3,184,018
REVERSIBLE DRIVE ASSEMBLY INCLUDING FLUID-POWERED PRIME MOVER
Filed Dec. 14, 1962 4 Sheets-Sheet 3

INVENTOR.
SOMMERVILLE G. CHRISTISON
BY *Seed\*o\*Berry*
ATTYS.

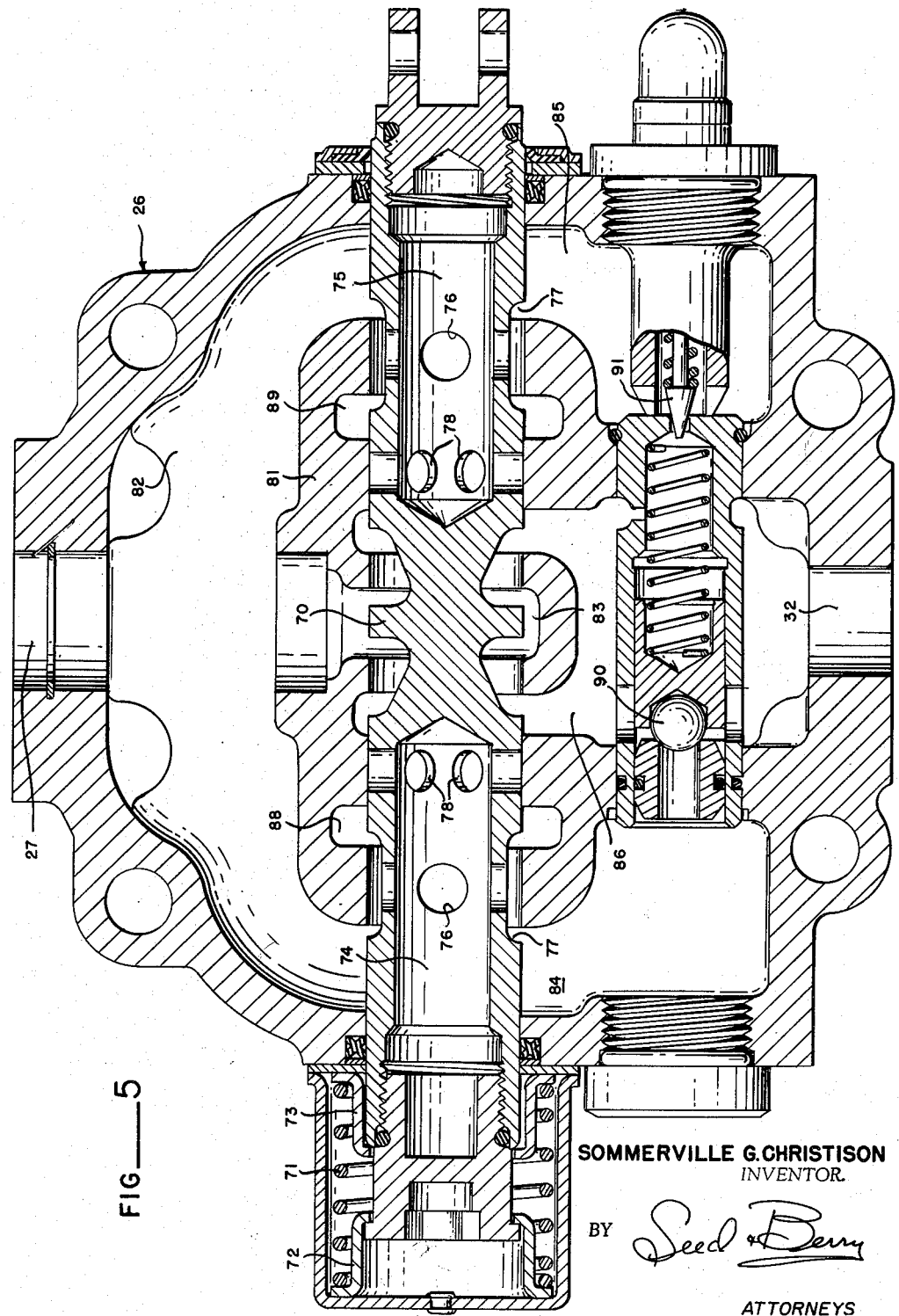

United States Patent Office 3,184,018
Patented May 18, 1965

3,184,018
REVERSIBLE DRIVE ASSEMBLY INCLUDING FLUID-POWERED PRIME MOVER
Sommerville Grant Christison, North Surrey, British Columbia, Canada, assignor, by mesne assignments, to Gearmatic Co. Ltd., North Surrey, British Columbia, Canada, a corporation of British Columbia
Filed Dec. 14, 1962, Ser. No. 244,759
10 Claims. (Cl. 192—3)

This invention relates to a reversible drive assembly including a fluid-powered prime mover, and for its general object aims to provide a perfected assembly of this nature incorporating a brake mechanism caused to be set automatically in response to an over-running of the prime mover by the assembly's output shaft in at least one direction of the latter's rotation and by such setting arresting the rotation of the shaft.

A further particular object is to provide a reversible drive assembly of this nature in which the output shaft is driven in both directions at the same speed.

The invention has the further important object of providing a reversible drive assembly in which the drive, in both directions of rotation, is passed from the fluid motor to the output shaft through planetary reduction gearing.

It is a yet further object of the invention to provide a reversible drive assembly of such compact design as to permit the same to be easily housed in one of the cheek bitts of a winch, an environment which Frank L. Lawrence illustrates and describes in his U.S. Pat. No. 2,959,396, issued Nov. 8, 1960.

With these and other objects and advantages in view and which will each appear and be understood in the course of the following description and claims, the invention consists in the novel construction and in the adaptation and combination of parts hereinafter described and claimed.

In the accompanying drawings:

FIG. 5 is a large-scale longitudinal sectional view of the control valve shown in FIG. 4.

Figure 1:
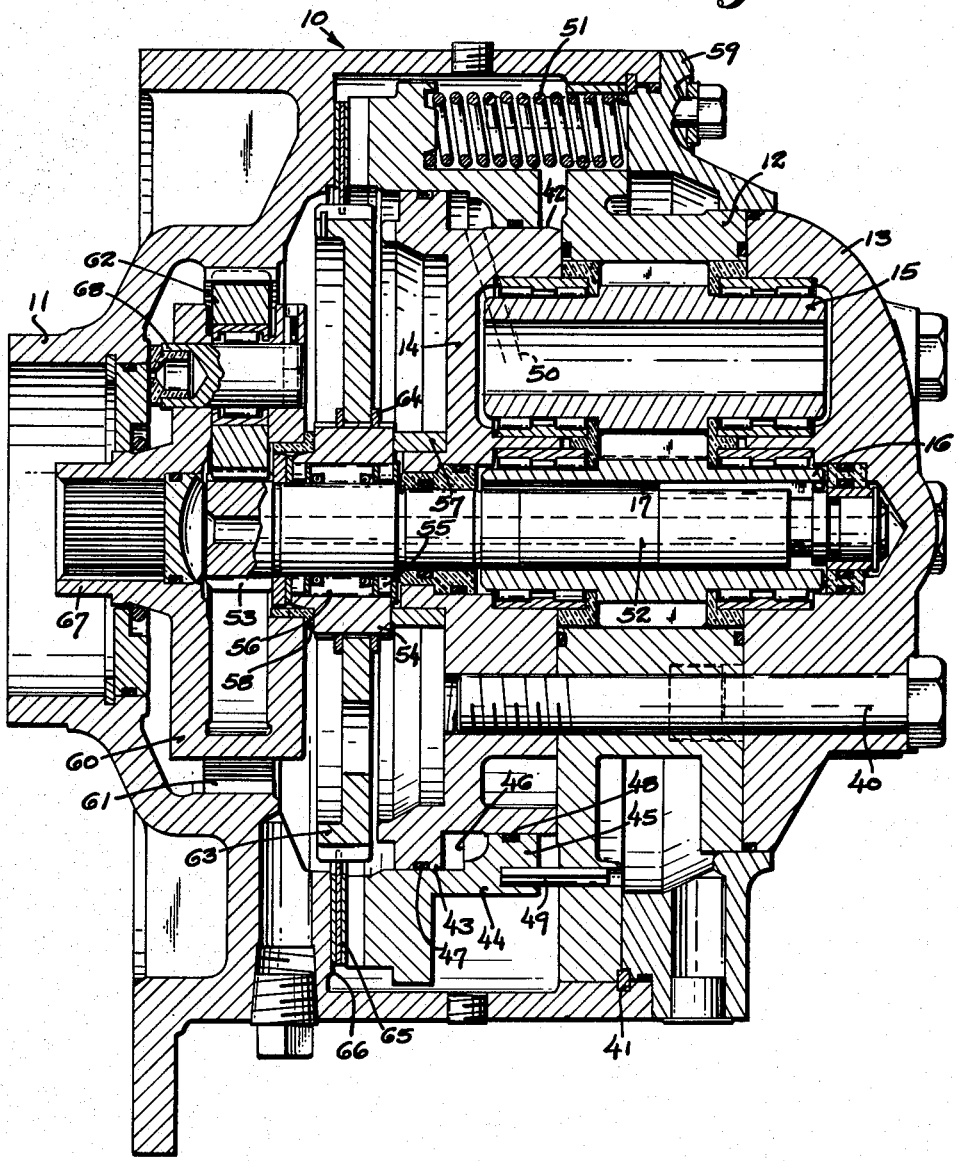
FIGURE 1 is a longitudinal vertical sectional view portraying a reversible drive assembly constructed in accordance with one embodiment of the present invention, one which is engineered to preclude the output shaft from over-running the fluid motor in only one direction of rotation.

First describing the embodiment of FIG. 1, the numeral 10 designates a housing having a hollow hub 11 at one end and at the other end presenting a chamber of expanded diameter which has somewhat of a bell shape and communicates with the hollow center of the hub. For ease of description the hub end of the housing will be hereinafter termed the rear end and the other end the front end. A desirable application of the present invention is one in which the housing serves as one of the two cheek bitts for the winding drum of a winch.

Figure 3:
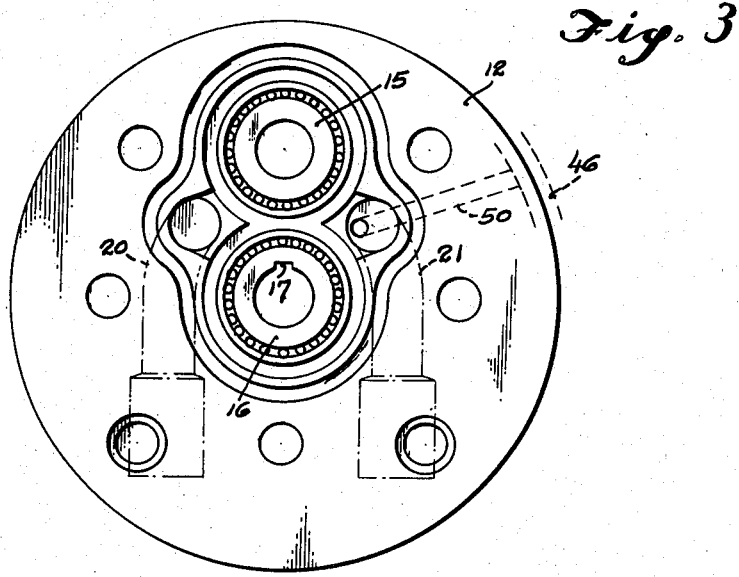
FIG. 3 is an elevational view of the face portion of a closure plate for the front end of the drive assembly's housing and which acts together with front and back headers to form the cylinder for the fluid motor.
Figure 4:
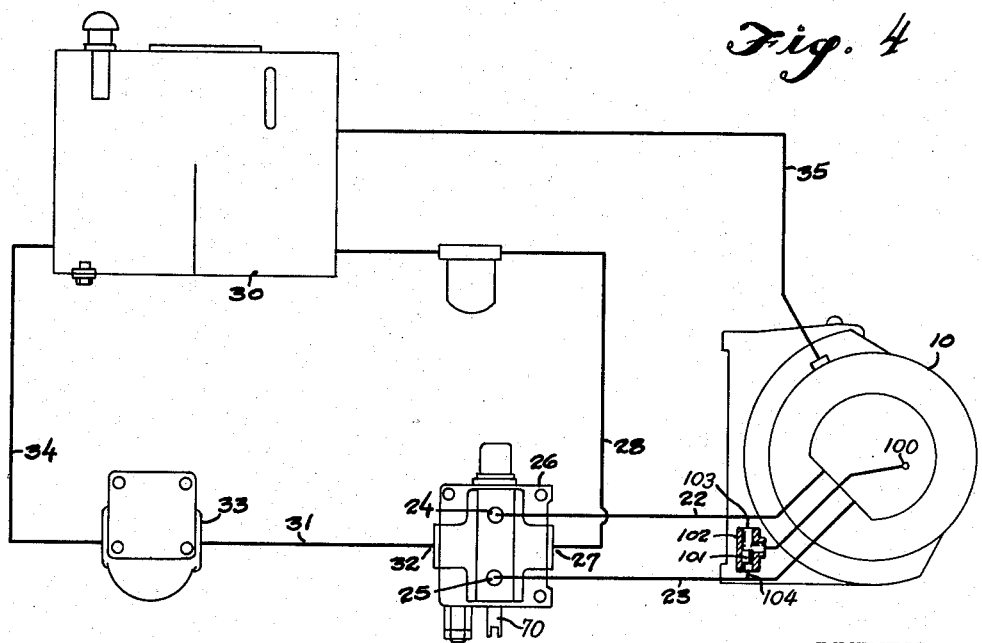
FIG. 4 is a schematic view illustrating the hydraulic system for the fluid motor, the view incorporating an illustration of a shuttle-type check valve which, however, is adapted to be employed only with the FIG. 2 embodiment.

A closure 12 for the front end of the housing acts in conjunction with front and rear headers 13 and 14, the latter open-centered, to form the cylinder for the matched gears 15 and 16 of a reversible rotary-type fluid motor. Gear 16, made hollow with a key-way 17 in its center, serves as the output rotor of the motor and occupies a position co-axial with the hub 11. The front header 13 and the closure 12 are suitably cored to provide separated flow passages 20 and 21 leading to opposite sides of the cylinder, and the outer ends of these flow passages, represented in phantom in FIG. 3, connect by flexible pressure-type hoses 22 and 23 (see FIG. 4) with two of three back-side ports, as 24 and 25, provided by a valve body 26 located remote to the housing. The other back-side port 27 connects by a dump line 28 with an oil reservoir 30. A hose 31 leads to a single front-side port 32 of the valve body from the high-pressure side of a pump 33, and a hose 34 supplies oil to the suction side of the pump from the reservoir 30. A bleed line 35 connects the interior of the housing with the reservoir.

The valve 70 for the valve body 26 is or may be of the shuttle type and is movable against the yielding resistance of a spring 71 from a centered neutral position into either of two operating positions located at the end limits of slide travel. Two spring keepers 72 and 73 which are made to move with the valve one in one direction and the other in the other direction act to normally center the valve and to prescribe the end limits of travel. The valve has two axially separated valving portions, each provided with a hollow center, as 74 and 75. Each of these valving portions, at its inner end and at its outer end, respectively, provides radial ports the former leading to the perimeter of the valve and the latter to a circumferential groove formed in the valve. The outer ports are denoted by 76 and the grooves to which the same lead by 77. The inner ports are designated by 78. The valve body is formed with a chest 81 surrounding the valving portions of the valve, and exteriorly of the chest provides a dump passage 82 leading to the dump port 27 from pockets, as 83, 84 and 85, which surround the valve at the center of the chest and at the two ends thereof. Interiorly of the chest, one pocket 86 is provided which is in constant communication with the inlet port 32. Two other pockets 88 and 89 surround the valved portions and lead one to the work port 24 and the other to the work port 25. In the normal centered position of the valve the grooves 77 bring both work pockets 88 and 89 into communication with the dump passage. In this position the valve also brings inlet pocket 86 into dumping communication with the pocket 83. When shifted to either end extreme of its shuttle movement the valve isolates the inlet pocket from the dump pocket, and supplies pressure fluid to one work pocket while dumping fluid from the other into one end pocket of the dump passage. The flow to the pressurized work pocket 88 or 89, as the case may be, is through one set of the radial ports 78 to the related hollow center 74 or 75 and thence outwardly through radial ports 76 to such pocket 88 or 89. The dumping flow from the other of the two pockets 88 and 89 is similarly through the radial ports 78 to the hollow interior of the concerned valving portion and then outwardly through ports 76 to the concerned end pocket of the dump passage. A suitable pressure relief system is or may comprise the illustrated assembly of ball valve 90 and regulated needle valve 91.

From the foregoing it will be apparent that the two hoses 22 and 23 can be made to communicate one with the other through the common dump passage (this being the neutral position) or a selected one of the two hoses 22 and 23 can be charged with fluid under pumping pressure while the other hose dumps back to the reservoir (these being the forward and reverse positions). Hollow spool valves of the type here described are conventional and are available from a number of industrial valve manufacturers. U.S. Pat. No. 2,359,802, issued October 10, 1944, illustrates and describes such a valve.

Reverting to the housing, it will be seen that the two headers 13 and 14 are drawn against the closure 12 by a set of cap screws 40, and that the front face of the closure, about the perimeter, bears against a snap ring 41.

The rim of the rear header 14 presents at its forward end a cylindrical lip section 42 disposed concentric with the rotary axis of the rotor 16, and at its rear extremity has an out-turned cylindrical flange 43. The large diameter of this stepped rim is considerably smaller than the inside diameter of the surrounding wall of the housing. A ring-shaped piston 44 surrounds the rim in the space which is thereby provided and is also stepped, internally in this instance, with the larger and smaller diameters being given slide fits with the external surface of the flange 43 and the lip section 42, respectively. Pins 49 carried by the piston and received for endwise sliding motion in the closure 12 hold the piston against rotation. Opposing end walls, of the header's out-turned flange 43 and the piston's inturned flange 45 define an annular cylinder 46. O-rings 47 and 48 seal the cylinder. A passageway 50 provides constant communication between cylinder 46 and the flow passage 21. Flow passage 21 is the flow passage which becomes pressurized when the control valve is shifted to its "reverse" position. Cylinder 46, when pressurized, moves the piston 44 in a forward direction against the yielding force of a set of compression springs 51. The springs take their purchase against a spring cover 59. Forward motion of the piston releases a brake hereinafter to be described. Rearward motion of the piston sets said brake.

52 denotes a motor shaft occupying the axial center of the housing. This shaft is keyed to the rotor of the motor and extends rearwardly therefrom through the open center of the rear header 14. The sun gear 53 for a planetary gear set to formed upon the rear extremity of the motor shaft in a position spaced to the rear of the read header. The intervening perimeter of the motor shaft is smooth-faced and functions as the inner race for a cam-type over-running clutch. An externally splined hub 54 for a brake wheel produces the outer race for the clutch and is carried by roller bearings 55 located to the front and to the rear of the cam locks 56. A thrust ring 57 separates the wheel hub from the rear header. The wheel hub's rear end is necked down and has a bushing 58 fitted thereon to give support to a carrier 60 for the planetary pinions 62 of the planetary gear set, such pinions being in mesh with the sun gear and with an internal gear 61 which is made an integral part of the housing. The carrier presents an internally splined nose prolongation 67 which is adapted to pass the drive to any suitable machine and such, for example, as the winding drum of a winch.

The brake wheel proper is designated by 63 and takes a spline fit upon the hub, being held against axial shifting by snap rings 64. A brake plate 65 is splined to the brake wheel and lies between the piston 44 and a facing shoulder 66 presented by the housing.

For the foregoing, and assuming employment of the described primary drive to power the winding drum of a winch, it will be seen that the speed of the cable in forward and reverse directions can be controlled from zero to maximum under all load conditions, by metering the flow of oil through the control valve. The control valve used is of the open center type having all ports open to the reservoir when the valve spool is in the neutral position. This allows oil to circulate freely through the motor until the brake brings the load to rest if the control valve is returned to neutral suddenly. In such instance the rotating blades of the hydraulic motor draw hydraulic fluid freely from and return hydraulic fluid freely to the pockets 84 and 85 of the dump passage 82. By thus preventing the buildup of excessive pressure on the motor, the drive assembly can be used to lower any load (up to the designed maximum) from zero to maximum line speed under complete control with smooth acceleration and deceleration. This is achieved by the automatic friction brake. When an unwinding load is applied to the cable on the winch drum the latter is precluded from turning by the connection which the cam-locks then establish between the motor shaft and the set brake. In order to lower a load with the winch, hydraulic pressure is applied to the reversing side of the motor. This pressure, which is also effective on the brake cylinder, builds up until the brake is released sufficiently to allow it to slip. If the load on the drum tries to drive the motor faster than the supply of oil will permit (i.e. if the motor tries to act as a pump), the hydraulic pressure will decrease in the brake cylinder causing an increase in the effective spring load and therefore, an increase in braking effort. In this way a balanced pressure is supplied to the motor and brake release cylinder according to the load on the winch drum. Therefore, the speed of the winch in reverse (and forward) is purely dependent on the volume of oil supplied to the motor through the control valve. If at any time the supply of oil to the motor is cut off, due to a broken supply line or power failure, the brake will automatically be applied and the winch cannot be reversed until the oil supply is renewed.

Figure 2:
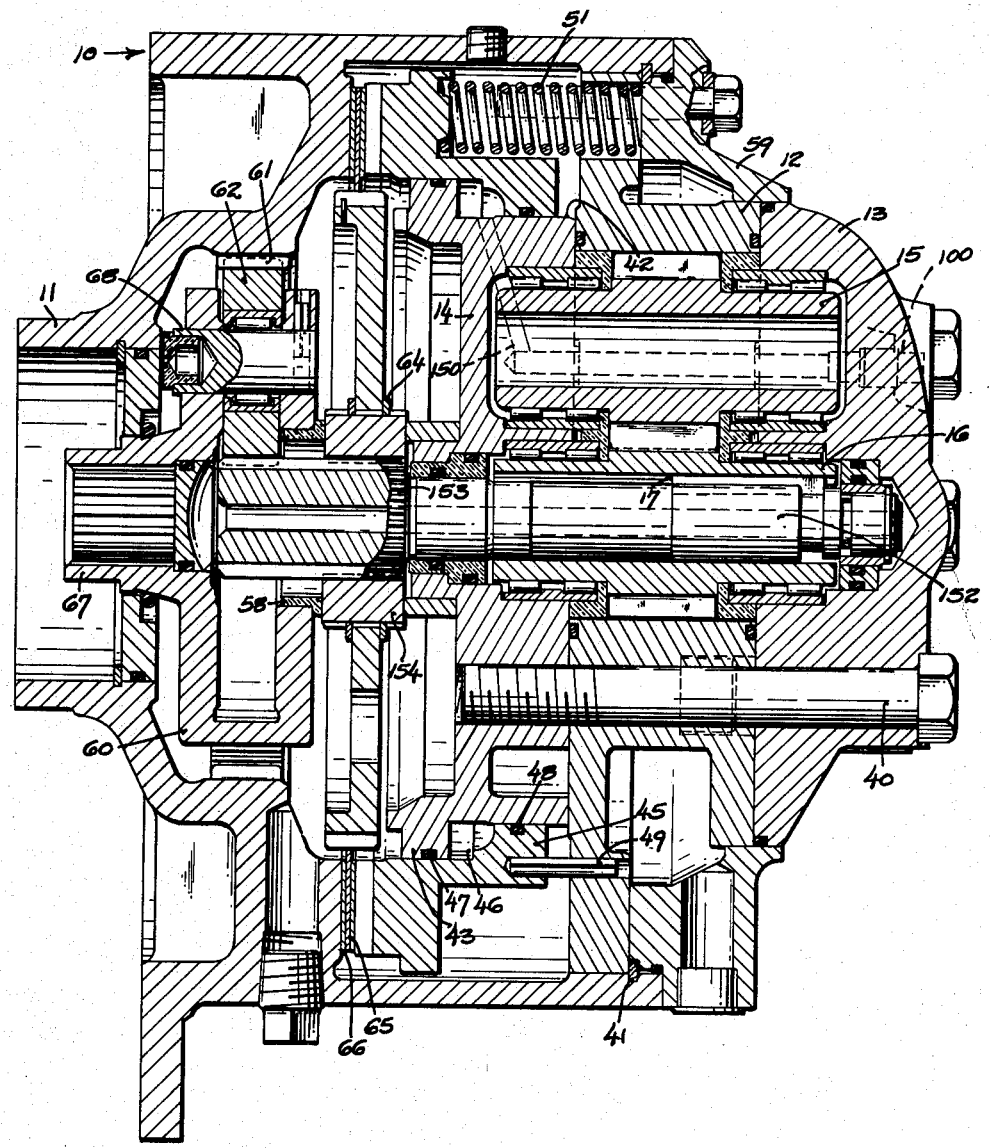
FIG. 2 is a similar section showing an embodiment engineered so the automatic brake is effective in both directions of rotation.

Now considering the embodiment shown in FIG. 2, the structure is modified in two respects and provides an automatic friction brake that is effective in both directions of rotation. One change is the deletion of the over-running clutch, which the brake hub 154 being rigidly fixed to the motor shaft 152 by taking a spline fit upon a toothed portion 153 of the shaft. The other change is that the cylinder 46 is pressurized, responsively releasing the brake, when the control valve is actuated for either direction of rotation. For this purpose I have incorporated in FIG. 4 an illustration of one system of supplying oil to the brake cylinder 46. A passageway 150 leads between the brake cylinder and a surface port 100. A spool 101 received for shuttle motion in a valve body 102 automatically brings said port 100, by means of connection 103 and 104, into communication with the hose 22 or the hose 23, depending upon which is pressurized. Upon return of the associated control valve to neutral the brake is automatically applied by the brake springs.

It is believed that the invention will have been clearly understood from the foregoing detailed description of my now-preferred illustrated embodiments. Changes in the details of construction may be resorted to without departing from the spirit of the invention and it is accordingly my intention that no limitations be implied and that the hereto annexed claims to be given the broadest interpretation to which the employed language fairly admits.

What I claim is:

1. In a transmission, a reversible fluid motor, a pressure source of fluid supply, a control valve for either isolating the motor from said pressure source or supplying pressure fluid therefrom to either side of the fluid motor, selectively so as to drive the same in either a forward or reverse direction, selectively, a driving shaft powered by said motor, a spring-set brake for the shaft, and means acting to release the brake automatically when power is applied from the fluid motor to drive the driving shaft, the control valve being characterized in that the same permits fluid to circulate freely through the motor when the motor is isolated from the pressure source so that the brake is the sole agency for bringing the driving shaft to rest and thus permits the motor to be smoothly accelerated and decelerated in all speeds from zero to maximum when being reversed with the driving shaft subjected to feed back loads tending to create an over-running condition.

2. The transmission of claim 1 in which the means last recited comprises a fluid cylinder and piston assembly working counter to the spring which sets said brake and operated simultaneously with the fluid motor by fluid delivered under pressure from the same source which supplies fluid to the fluid motor.

3. The transmission of claim 1 in which means are provided permitting the shaft to at all times run free of the brake in a forward direction of rotation, thus making the brake effective to hold the driving shaft against turning free only in a reverse direction.

4. The transmission of claim 1 in which the means last recited releases the brake when the fluid motor drives the driving shaft in either forward or reverse rotation.

5. In a transmission, a reversible fluid motor, a source of fluid under pressure, means for supplying fluid from said source to the fluid motor so as to drive the motor in either a forward or reverse direction of rotation, selectively, a driving shaft driven by the motor, a wheel having its hub so mounted on said shaft that the hub produces the outer race of an over-running clutch acting when engaged to couple the wheel to the shaft and caused to be engaged when the shaft turns in a reverse direction of rotation, a brake acting when engaged to arrest the rotation of said wheel, a spring acting to set said brake, and a means operatively connected with the spring and acting automatically to retract the latter and responsively free the wheel when the fluid motor is driven in a reverse direction.

6. The transmission of claim 5 in which the means last recited comprises a member movable in spring-retracting motion by fluid under pressure and having constant communication with the reversing side of the fluid motor.

7. A transmission according to claim 5 in which said means last recited comprises a fluid cylinder and piston assembly.

8. The transmission of claim 5 in which the sun gear for a planetary gear set is formed upon the output end of the driving shaft, and wherein the planetary gearing of said gear set together with the fluid motor, the driving shaft, and the recited braking mechanism are all housed in a casing serving as one of the two cheek bitts for the winding drum of a winch.

9. In a transmission, a reversible fluid motor, a source of fluid under pressure, means for supplying fluid from said source to the fluid motor so as to drive the motor in either a forward or reverse direction of rotation, selectively, a driving shaft driven by the motor, a wheel coupled to the shaft so as to turn in concert therewith, a brake acting when engaged to arrest the rotation of the wheel, a spring normally acting to set the brake, and means operatively connected with the spring and acting automatically to retract the latter and responsively free the wheel when the fluid motor is driven in either direction of rotation, the brake including a friction plate coupled to the driving wheel so as to turn therewith, the automatically acting means comprising: two non-rotating members producing a chamber therebetween expandible by pressure of fluid delivered thereto and having one of said members occupying and intervening position between the spring and the friction plate so that the load of the spring is applied against said member either to press said member against the friction plate and responsively set the brake, or upon an expansion of the chamber, to act counter to the spring load and release the brake, and a connection through which chamber-expanding pressure fluid is fed to the chamber from whichever side of the fluid motor to which the motor-driving fluid is being supplied.

10. The transmission of claim 9 in which the sun gear for a planetary gear set is formed upon the output end of the driving shaft, and wherein the planetary gearing of said gear set together with the fluid motor, the driving shaft, and the recited braking mechanism are all housed in a casing serving as one of the two cheek bitts for the winding drum of a winch.

References Cited by the Examiner
UNITED STATES PATENTS

| | | | |
|---|---|---|---|
| 2,246,923 | 6/41 | Meunier | 192—3 |
| 2,831,554 | 4/58 | Reynolds | 192—3 |
| 2,927,669 | 3/60 | Walerowski | 192—3 |
| 3,043,412 | 7/62 | Bartholomaus et al. | 192—3 |
| 3,125,200 | 3/64 | Kaman | 192—3 |

DAVID J. WILLIAMOWSKY, *Primary Examiner.*